Patented Aug. 9, 1932

1,870,880

UNITED STATES PATENT OFFICE

WILLIAM P. ter HORST, OF PACKANACK LAKE, NEW JERSEY, ASSIGNOR TO THE NAUGATUCK CHEMICAL COMPANY, OF NAUGATUCK, CONNECTICUT, A CORPORATION OF CONNECTICUT

TREATMENT OF RUBBER

No Drawing.   Application filed July 29, 1930.  Serial No. 471,589.

This invention relates to processes of treating rubber and similar vulcanizable materials, and particularly to processes of producing rubber products having increased resistance to deterioration and to the resulting products.

An object of this invention is to provide a new class of deterioration retarders. Another object is to provide a process for preventing or retarding the deterioration of rubber where such deterioration is due to the influence of air or light or both. A further object is to provide a process for retarding deterioration of rubber by treating the same before, during, or after vulcanization with the new anti-oxidants disclosed herein.

The invention broadly comprises treating rubber with a material resulting from the reaction of a phenol, a ketone, and an aromatic amine in a single step operation. The expression "a phenol" is to be construed broadly and as including any phenolic body containing one hydroxyl group per benzene or naphthalene nucleus. Exactly what occurs during the course of the reaction is not definitely known. The separate components have an affinity for reacting one with the other, and the resulting products also may react again with the free components during the course of the reaction. For example in the case of beta-naphthol-aniline-acetone it is probable that among other possible reactions the component beta naphthol reacts with the component aniline to form phenyl beta naphthyl amine which in turn reacts with the component acetone.

The following examples are illustrative of the process and are not to be construed as limiting thereof:

Example 1.—144 grams (1 mol) of beta naphthol, 93 grams (1 mol) of aniline, 500 grams of acetone and 2 grams of iodine are heated at approximately 200 to 220° C. in a rotating iron autoclave during 24 hours. From the autoclave is obtained 722.5 grams of a dark brown liquid. The loss in weight due to leakage therefore amounts to only 16.5 grams. Excess of acetone, water formed during the reaction, and a small amount of unreacted aniline are removed by distillation. The resulting product is a heavy oil. This material was tested as an antioxidant in a carbon black stock consisting of 100 parts smoked sheet, 10 parts zinc oxide, 42 parts carbon black, 3.25 parts of stearic acid, 3.25 parts of sulphur, 3.5 parts of pine tar, and 1.25 parts of mercaptobenzothiazole. The results of tests are as follows:

|  | Blank | Stock containing 1.3 parts beta naphthol-aniline-acetone reaction product |
|---|---|---|
| *Green tensiles* |  |  |
| 60' at 30# | 4513 | 4363 |
| 70' at 30# | 4400 | 4387 |
| *Aged tensiles 24 hours at 212° F.* |  |  |
| 60' at 30# | 2258 | 3665 |
| 75' at 30# | 1085 | 2885 |
| *Aged tensiles 168 hours oxygen* |  |  |
| 60' at 30# | 2293 | 2932 |
| 75' at 30# | 1935 | 2775 |

The same antioxidant was again tested in a similar carbon black stock in which hexamethylene tetramine was used as the accelerator. Results are as follows:

|  | Blank | Stock containing 1 part beta naphthol-aniline-acetone reaction product |
|---|---|---|
| *Green tensiles* |  |  |
| 60' at 45# | 3928 | 4173 |
| 75' at 45# | 4137 | 4127 |
| *Aged tensiles 168 hours oxygen* |  |  |
| 60' at 45# | 1851 | 3416 |
| 75' at 45# | 1436 | 3347 |
| *Aged tensiles 3 weeks at 158° F.* |  |  |
| 60' at 45# | 2755 | 4165 |
| 75' at 45# | 2542 | 4230 |

Example 2.—A mixture of 141 grams (1.5 mols) phenol, 139.5 grams (1.5 mols) aniline, 500 grams acetone and 2 grams of iodine are heated during 28 hours at 220° to 240° C. The reaction mixture is worked up in the same way as above. In this case, however, a rather large amount of unreacted phenol was recovered. The reaction product was tested as an antioxidant in a carbon black stock in which hexamethylene tetramine was used as the accelerator. Results are as follows:

|  | Blank | Stock containing 1.5 parts phenol-aniline-acetone reaction product |
|---|---|---|
| *Green tensiles* | | |
| 60′ at 45# | 4450 | 4677 |
| 75′ at 45# | 4424 | 4690 |
| *Aged tensiles* 168 hours oxygen | | |
| 60′ at 45# | 1851 | 3414 |
| 75′ at 45# | 1436 | 3148 |

Example 3.—This preparation is analogous to the previous one with the exception that instead of aniline, aniline hydrochloride was used. A mixture of 141 grams (1.5 mols) of phenol, 194.5 grams (1.5 mols) of aniline hydrochloride and 500 grams acetone are heated during 28 hours at approximately 220 to 240° C. Since hydrochloric acid is used as a dehydrating agent, no addition of iodine is necessary. The contents of the autoclave after heating are liquid and after removal of excess of acetone the mass is made alkaline, and unreacted aniline removed by distillation. 336.5 grams of a solid reaction product is obtained. This material when tested in a carbon black stock in which hexamethylene tetramine was used as the accelerator gave the following results:

|  | Blank | Stock containing 1.5 parts phenol-aniline hydrochloride-acetone reaction product |
|---|---|---|
| *Green tensiles* | | |
| 60′ at 45# | 4142 | 4089 |
| 75′ at 45# | 4530 | 4117 |
| *Aged tensiles* 168 hours oxygen | | |
| 60′ at 45# | 1312 | 3005 |
| 75′ at 45# | 1271 | 2774 |

Instead of acetone, other ketones may be used such as methyl ethyl ketone, diethyl ketone, ethylidene acetone, cyclohexanone, cyclopentanone. Instead of aniline other primary aromatic amines may be used such as ortho toluidine, mixed toluidines, naphthyl amines. Instead of phenol or naphthol there may be used other phenolic bodies such as p,p′ dihydroxy-diphenyl methane, methylene di-beta naphthol, trioxy-triphenyl-propane. The deterioration retarders may be used to retard the deterioration of tires, tubes, mechanical goods, latex, artificially prepared dispersions of rubber or rubber-like materials, balata, rubber tiling, transparent films of rubber or the like.

The term "rubber" is to be construed broadly as including rubber in any form, for example vulcanized or unvulcanized rubber, compounded or uncompounded rubber, and also rubber-like materials such as balata and gutta percha. Other compounding materials and accelerators than those specially mentioned herein may be employed in conjunction with the new antioxidant. The antioxidants may be introduced into the rubber in any desired manner; they may be applied to the stock as by mixing, painting, spraying, dipping, diffusion, etc., either before or after the stock is subjected to vulcanization, or if desired, the stock may be vulcanized in a solution or suspension of the anti-oxidant. Also instead of employing a single anti-ager a mixture of any of them may be used.

With the detailed description given above, it will be obvious that modifications will suggest themselves without departing from the principle of the invention, and it is not desired to limit the invention otherwise than as set forth in the appended claims.

Having thus described my invention, what I claim and desire to protect by Letters Patent is:

1. A process of treating rubber which comprises incorporating with rubber the product resulting from reacting in a single step operation a phenol, a primary aromatic amine, and a ketone selected from the group consisting of aliphatic ketones and alicyclic ketones.

2. A process of treating rubber which comprises incorporating with rubber the product resulting from reacting a phenol, a primary aromatic amine and an aliphatic ketone in a single step operation.

3. A process of treating rubber which comprises incorporating with rubber the product resulting from reacting a phenol, an aniline-containing material and acetone in a single step operation.

4. A process of treating rubber which comprises incorporating with rubber the product resulting from reacting phenol, aniline and acetone in a single step operation.

5. A process of treating rubber which comprises incorporating with rubber the product resulting from reacting phenol with a primary aromatic amine and an aliphatic ketone in a single step operation.

6. A process of treating rubber which comprises incorporating with rubber the product resulting from reacting a naphthol with a primary aromatic amine and an aliphatic ketone in a single step operation.

7. A process of treating rubber which comprises incorporating with rubber the product resulting from reacting phenol, aniline and an aliphatic ketone in a single step operation.

8. A process of treating rubber which comprises incorporating with rubber the product resulting from reacting a naphthol, aniline and acetone in a single step operation.

9. A process of treating rubber which comprises incorporating with rubber the product resulting from reacting beta naphthol, aniline and acetone in a single step operation, and vulcanizing the rubber.

10. A rubber product obtained according to the process of claim 1.

11. A rubber product obtained from treating rubber with the material resulting from reacting in a single stage operation a phenol, a primary aromatic amine, and an aliphatic ketone.

12. A rubber product obtained from treating rubber with the material resulting from reacting in a single stage operation phenol, aniline and acetone.

13. A rubber product obtained from treating rubber with the material resulting from reacting in a single stage operation beta-naphthol, aniline and acetone.

Signed at Passaic, county of Passaic, State of New Jersey, this 21st day of July, 1930.

WILLIAM P. TER HORST.